Patented July 13, 1943

2,324,286

UNITED STATES PATENT OFFICE 2,324,286

TRIAZINE DERIVATIVES

Gaetano F. D'Alelio, Pittsfield, Mass., assignor to General Electric Company, a corporation of New York No Drawing. Application March 31, 1942,
Serial No. 436,955

15 Claims. (Cl. 260—248)

This invention relates to new chemical compounds and more particularly to triazine derivatives. The invention especially is concerned with the production of new and useful compounds corresponding to the following general formula:

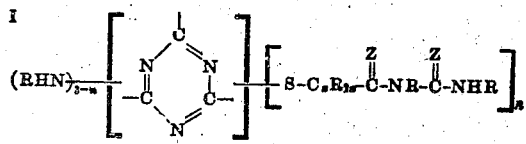

wherein $n$ represents an integer and is at least 1 and not more than 3, $x$ is an integer and is at least 1 and not more than 2, Z represents a member of the class consisting of oxygen and sulfur, and R represents a member of the class consisting of hydrogen and monovalent hydrocarbon and substituted hydrocarbon radicals, more particularly halo-hydrocarbon radicals. These compounds are triazinyl thio acyl ureas of triazinyl thio thionoacyl ureas. From a consideration of the formula it will be seen that when $n$ is 3 there will be no amino (—NHR) groups attached to the triazine nucleus.

Illustrative examples of monovalent radicals that R in the above formula may represent are aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc., including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylisopropyl, cinnamyl, etc.); and their homologues, as well as those groups with one or more of their hydrogen atoms substituted by, for example, a halogen. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, fluorophenyl, iodophenyl, bromotolyl, etc. Preferably R in Formula I is hydrogen. However, there also may be produced in accordance with the present invention compounds such, for instance, as those represented by the general formulas:

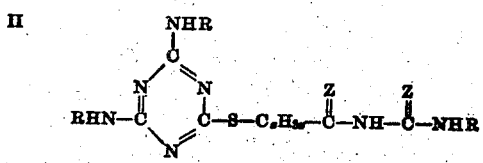

and, more particularly,

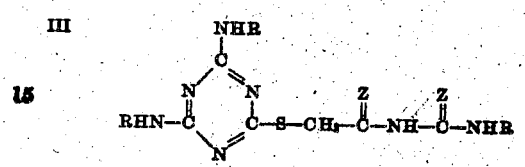

where $x$, Z and R have the same meanings as given above with reference to Formula I.

The new compounds of this invention may be used, for example, as pharmaceuticals, plasticizers, fungicides, insecticides, as an intermediate in the preparation of dyes and other chemical compounds, for instance imido ether, amidine, hydrazino, methylol, etc. derivatives. These new compounds are especially valuable in the preparation of synthetic resinous compositions. Thus, they may be condensed with, for instance, aldehydes, including polymeric aldehydes, hydroxy aldehydes and aldehyde-addition products, to yield condensation products of particular utility in the plastics and coating arts. Such condensation products are more fully described and are specifically claimed in my copending application Serial No. 439,390, filed April 17, 1942, and assigned to the same assignee as the present invention. These new compounds or their aldehyde-addition products also may be compounded with rubber, both natural and synthetic, to modify the properties of the rubber.

Various methods may be employed to produce the chemical compounds of this invention. I prefer to prepare them by effecting reaction between a mercapto triazine and a mono-halogenated acylated or thionoacylated urea or thiourea in the presence of a hydrohalide acceptor. Illustrative examples of mercapto triazines, more particularly mercapto s-triazines (symmetrical triazines) that may be used, depending upon the particular end-product desired, are:

2-mercapto 4,6-diamino s-triazine (4-mercapto 2,6-diamino s-triazine; 6-mercapto 2,4-diamino (s-triazine)
2,4-dimercapto 6-amino s-triazine
2,4,6-trimercapto s-triazine
2-mercapto 4,6-di-(methylamino) s-triazine
2-mercapto 4,6-di-(cyclohexylamino) s-triazine
2-mercapto 4,6-di-(toluido) s-triazine
2-mercapto 4-methylamino 6-benzylamino s-triazine
2,4-dimercapto 6-naphthylamino s-triazine
2,4-dimercapto 6-ethylamino s-triazine
2,4-dimercapto 6-chloroanilino s-triazine
2-mercapto 4,6-di-(anilino) s-triazine
2-mercapto 4,6-di-(propylamino) s-triazine
2-mercapto 4-allylamino 6-butylamino s-triazine
2-mercapto 4-isobutylamino 6-cyclopentylamino s-triazine
2-mercapto 4,6-di-(3'-butenylamino) s-triazine
2,4-dimercapto 6-iodoanilino s-triazine
2,4-dimercapto 6-bromothylamino s-triazine
2-mercapto 4-cyclohexenylamino 6-naphthylamino s-triazine
2-mercapto 4-bromotoluido 6-benzylamino s-triazine
2-mercapto 4-phenylchloroethylamino 6-phenethylamino s-triazine
2,4-dimercapto 6-cycloheptylamino s-triazine
2,4-dimercapto 6-chloroethylamino s-triazine
2,4-dimercapto 6-fluoroanilino s-triazine
2-mercapto 4-dichloroanilino 6-chloroethylamino s-triazine
2-mercapto 4-amino 6-bromopropylamino s-triazine
2-mercapto 4-amino 6-methylamino s-triazine
2-mercapto 4-amino 6-naphthylamino s-triazine
2,4-dimercapto 6-methylamino s-triazine Illustrative examples of mono-halogenated acylated and thionoacylated ureas and thioureas that may be employed, depending upon the particular end-product desired, are:

Chloroacetyl urea
Chlorothionoacetyl urea
Bromoacetyl urea
Bromothionoacetyl urea
Chlorothionoacetyl thiourea
Iodoacetyl urea
Chloroacetyl thiourea
Bromoacetyl thiourea
Iodoacetyl thiourea
Alpha-chloropropionyl urea
Beta-chloropropionyl urea
Alpha-chlorobutyryl urea
Beta-bromobutyryl urea
N-chloroacetyl N'-phenyl urea
N-chloroacetyl N'-tolyl thiourea
N-chloroacetyl N'-phenyl thiourea
N-chloroacetyl N'-chlorophenyl urea
N-chloroacetyl, N'-diphenyl urea Alpha-chloro beta-phenyl propionyl urea
N-(beta-chloro alpha-ethyl propionyl) N'-xylyl urea
N-(alpha-benzyl beta-bromo gamma-phenyl butyryl) N-benzyl thiourea
Alpha-chlorophenyl beta-chloro propionyl thiourea
Beta-cyclohexyl beta-bromo propionyl thiourea
N-(beta-chloro butyryl) N,N'-diphenyl thiourea
N-chlorothionoacetyl N'-phenyl urea
N-bromothionoacetyl N'-tolyl urea
N-chlorothionoacetyl N'-phenyl thiourea Various hydrohalide acceptors may be employed. I prefer to use a hydrohalide acceptor that will react with the mercapto triazine to form a water-soluble salt. Examples of such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto triazine and the mono-halogenated acylated or thionoacylated urea or thiourea may be carried out in any suitable manner, but preferably is effected in the presence of a suitable solvent or mixture of solvents. Although various solvents and solvent mixtures may be employed, I prefer to use water or a mixture of water and alcohol. The reaction may be carried out under a variety of temperature and pressure conditions, for instance at normal, sub-normal or at elevated temperatures and at atmospheric, sub-atmospheric or super-atmospheric pressures.

The above reaction may be represented by the following general equation:

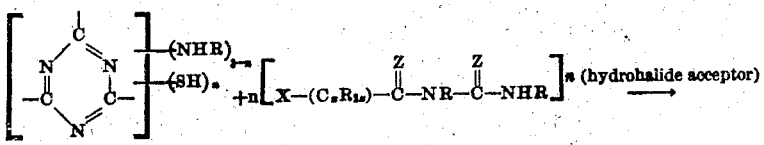

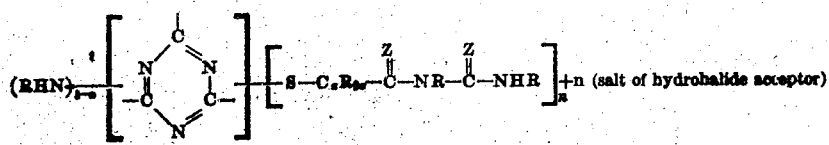

In the above equation X represents halogen and $n$, $x$, Z and R have the same meanings as given above with reference to Formula I.

The new chemical compounds of this invention also may be prepared by effecting reaction between a halogenated triazine and a mono-mercapto acylated or thionoacylated urea or thiourea in the presence of a hydrohalide acceptor. This reaction may be carried out by any suitable means but preferably is effected in the presence of an anhydrous solvent, e. g., alcohol. The other conditions of reaction may be the same as described above with reference to the first-mentioned method of preparation.

In order that those skilled in the art better may understand how the present invention may be carried into effect, the following illustrative examples are given. All parts are by weight.

Example 1

This example illustrates the preparation of diamino s-triazinyl thio acetyl urea, the formula for which is

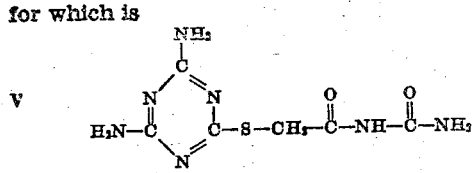

| | Parts |
|---|---|
| Chloroacetyl urea (melting point 186–188° C.) | 86.0 |
| Thioammeline | 90.5 |
| Sodium hydroxide | 26.0 |

The thioammeline and sodium hydroxide were dissolved in 750 parts hot water, yielding a solution of the sodium salt of the thioammeline. The chloroacetyl urea (monochloroacetyl urea) was dissolved in 2,000 parts boiling water. Both solutions were mixed together. The reaction mixture was boiled for 1 hour, following initial precipitation of the reaction product comprising diamino s-triazinyl thio acetyl urea, and finally was cooled to 10° C. The precipitated reaction product was removed by filtration, washed free of soluble salts and dried. The purified and dried product decomposed without melting at 220–240° C. It was soluble in 10% sodium hydroxide solution, but was insoluble in dioxane, ethyl alcohol, ether, benzene and chloroform.

Example 2

4,6-di-(methylamino) s-triazinyl-2 thio acetyl urea is prepared in essentially the same manner as described under Example 1 with the exception that, instead of thioammeline, an equivalent amount of 2-mercapto 4,6-di-(methylamino) s-triazine is employed.

Example 3

Diamino s-triazinyl thio acetyl thiourea is prepared in essentially the same manner as described under Example 1 with the exception that, instead of chloroacetyl urea, an equivalent amount of chloroacetyl thiourea is used.

Example 4

Diamino s-triazinyl thio thionoacetyl urea is prepared in essentially the same manner as described under Example 1 with the exception that, instead of chloroacetyl urea, an equivalent amount of chlorothionoacetyl urea is employed.

Example 5

Diamino s-triazinyl thio thionoacetyl thiourea is prepared in essentially the same manner as described under Example 1 with the exception that, instead of chloroacetyl urea, an equivalent amount of chlorothionoacetyl thiourea is used.

As will be readily understood by those skilled in the art, when it is desired to produce compounds containing a single monoamino triazinyl grouping and two thio acetyl (or thionoacetyl) urea (or thiourea) groupings, or compounds containing a triazinyl grouping and three thio acetyl (or thionoacetyl) urea (or thiourea) groupings, then the starting reactants and proportions of reactants are chosen so as to yield the desired products in accordance with methods such as above given by way of illustration.

Other examples of the new chemical compounds of this invention are listed below:

Monoamino s-triazinyl di-(thio acetyl urea)
Monoamino s-triazinyl di-(thio acetyl thiourea)
Monoamino s-triazinyl di-(thio thionoacetyl urea)
Monoamino s-triazinyl di-(thio thionoacetyl thiourea)
Monoamino s-triazinyl di-(alpha-thio propionyl urea)
Monoamino s-triazinyl di-(beta-thio propionyl urea)
Monoamino s-triazinyl di-(alpha-thio propionyl thiourea)
Monoamino s-triazinyl di-(beta-thio propionyl thiourea)
Monoamino s-triazinyl di-(alpha-thio thionopropionyl urea)
Monoamino s-triazinyl di-(beta-thio thionopropionyl urea)
Monoamino s-triazinyl di-(alpha-thio thionopropionyl thiourea)
Monoamino s-triazinyl di-(beta-thio thionopropionyl thiourea)
s-Triazinyl-2,4,6 tri-(thio acetyl urea)
s-Triazinyl-2,4,6 tri-(thio acetyl thiourea)
s-Triazinyl-2,4,6 tri-(thio thionoacetyl urea)
s-Triazinyl-2,4,6 tri-(thio thionoacetyl thiourea)
s-Triazinyl-2,4,6 tri-(alpha-thio propionyl urea)
s-Triazinyl-2,4,6 tri-(beta-thio propionyl urea)
s-Triazinyl-2,4,6 tri-(alpha-thio propionyl thiourea)
s-Triazinyl-2,4,6 tri-(beta-thio propionyl thiourea)
s-Triazinyl-2,4,6 tri-(alpha-thio thionopropionyl urea)
s-Triazinyl-2,4,6 tri-(beta-thio thiopropionyl urea)
s-Triazinyl-2,4,6 tri-(alpha-thio thionopropionyl thiourea)
s-Triazinyl-2,4,6 tri-(beta-thio thionopropionyl thiourea)
Diamino s-triazinyl mono-(alpha-thio propionyl urea)
Diamino s-triazinyl mono-(beta-thio propionyl urea)
Diamino s-triazinyl mono-(alpha-thio propionyl thiourea)
Diamino s-triazinyl mono-(beta-thio propionyl thiourea)
Diamino s-triazinyl mono-(alpha-thio thionopropionyl urea)
Diamino s-triazinyl mono-(beta-thio thionopropionyl urea)
Diamino s-triazinyl mono-(alpha-thio thionopropionyl thiourea)
Diamino s-triazinyl mono-(beta-thio thionopropionyl thiourea)
Diamino s-triazinyl mono-(alpha-thio valeryl urea)
Diamino s-triazinyl mono-(beta-thio valeryl urea)
Diamino s-thiazinyl mono-(alpha-thio valeryl thiourea)
Diamino s-triazinyl mono-(beta-thio valeryl thiourea)
6-amino s-triazinyl 2-(thio acetyl urea) 4-beta-thio propionyl urea)
4-anilino 6-methylamino s-triazinyl-2 thio acetyl urea
4,6-diamino s-triazinyl-2 N-(beta-thio propionyl) N'-phenyl urea
4,6-di-(chloroethylamino) s-triazinyl-2 thio acetyl urea
4,6-di-(fluoroanilino) s-triazinyl-2 alpha-thio propionyl urea
4,6-di-(iodotoluido) s-triazinyl-2 beta-thio propionyl thiourea 4,6-di-(bromonaphthylamino) s-triazinyl-2 alpha-thio butyryl urea 4,6-di-(methylamino) s-triazinyl-2 beta-thio alpha-phenyl butyryl urea 4,6-di - (anilino) s - triazinyl - 2 N - (beta - thio gamma-cyclohexyl butyryl) N'-methyl thiourea 4,6-diamino s-triazinyl-2 N-(alpha-thio propionyl) N,N'-diphenyl urea 6-toluido s-triazinyl-2,4 di-[N-(beta-thio valeryl) N'-benzyl urea]

6-methylamine s-triazinyl-2,4 di-(beta-thio alpha-chlorophenyl thionopropionyl urea)

s-Triazinyl-2,4,6 tri[N-(thio acetyl) N'-cyclohexyl urea]

s-Triazinyl-2,4,6 tri-(beta-thio alpha-phenyl butyryl thiourea)

6-amino s-triazinyl 2-(thio acetyl urea) 4-(thio thionoacetyl urea)

Diamino s-triazinyl alpha-thio beta-fluorophenyl propionyl urea

Diamino s-triazinyl beta-thio alpha-bromopropyl propionyl thiourea

In a manner similar to that above described with particular reference to the preparation of symmetrical triazinyl (s-triazinyl) thio acyl and thio thionoacyl ureas and thioureas, corresponding derivatives of the asymmetrical and vicinal triazines may be prepared.

What I claim as new and desire to secure by Letters Patent of the United States is:

1. Chemical compounds corresponding to the general formula

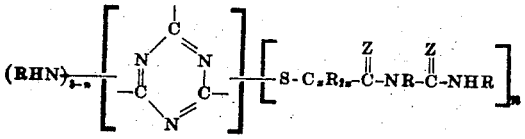

where $n$ represents an integer and is at least 1 and not more than 3, $x$ is an integer and is at least 1 and not more than 2, Z represents a member of the class consisting of oxygen and sulfur, and R represents a member of the class consisting of hydrogen and monovalent hydrocarbon and halo-hydrocarbon radicals.

2. Chemical compounds as in claim 1 wherein R represents hydrogen.

3. Chemical compounds as in claim 1 wherein $n$ is 3.

4. Chemical compounds as in claim 1 wherein $n$ is 2.

5. Chemical compounds as in claim 1 wherein $n$ is 1.

6. Chemical compounds as in claim 1 wherein R represents hydrogen and Z represents oxygen.

7. Chemical compounds as in claim 1 wherein R represents hydrogen and $x$ is 1.

8. Chemical compounds corresponding to the general formula

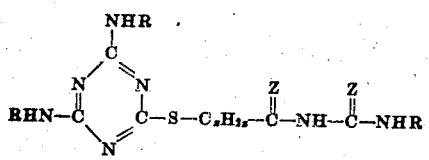

where $x$ is an integer and is at least 1 and not more than 2, Z represents a member of the class consisting of oxygen and sulfur, and R represents a member of the class consisting of hydrogen and monovalent hydrocarbon and halo-hydrocarbon radicals.

9. Chemical compounds corresponding to the general formula

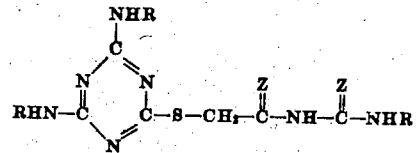

where Z represents a member of the class consisting of oxygen and sulfur, and R represents a member of the class consisting of hydrogen and monovalent hydrocarbon and halo-hydrocarbon radicals.

10. Symmetrical triazinyl-2,4,6 tri-(thio acetyl urea).

11. Monoamino s-triazinyl di-(thio acetyl urea).

12. Diamino s-triazinyl thio acetyl urea.

13. The method of preparing chemical compounds corresponding to the general formula

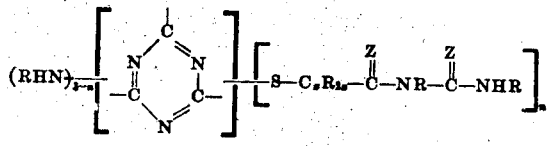

where $n$ represents an integer and is at least 1 and not more than 3, $x$ is an integer and is at least 1 and not more than 2, Z represents a member of the class consisting of oxygen and sulfur, and R represents a member of the class consisting of hydrogen and monovalent hydrocarbon and halo-hydrocarbon radicals, said method comprising effecting reaction, in the presence of a hydrohalide acceptor, between (1) a mercapto triazine corresponding to the general formula

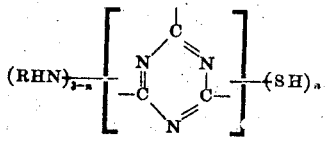

where $n$ and R have the meanings above given, and (2) a mono-halogenated compound corresponding to the general formula

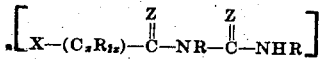

where X represents halogen, and $n$, $x$, Z and R have the meanings above given.

14. A method as in claim 13 wherein the hydrohalide acceptor is an alkali-metal hydroxide.

15. The method of preparing diamino s-triazinyl thio acetyl urea which comprises effecting reaction, in the presence of a hydrohalide acceptor, between thioammeline and chloroacetyl urea.

GAETANO F. D'ALELIO.

CERTIFICATE OF CORRECTION.

Patent No. 2,324,286.                    July 13, 1943.

GAETANO F. D'ALELIO.

It is hereby certified that error appears in the printed specification of the above numbered patent requiring correction as follows: Page 1, first column, line 21, for "of" read --or--; and second column, line 26, after "etc." insert a comma; page 2, first column, line 5, for "(s-triazine) read --s-triazine)--; line 23, first column, for "bromothylamino" read --bromoethylamino--; line 75, for "N'-diphenyl" read --N,N'-diphenyl--; page 3, second column, line 60, for "thiazinyl" read --triazinyl--; line 64, before "beta" insert an opening parenthesis; page 4, first column, line 12, for "methylamine" read --methylamino--; line 14, for "tri[N-" read -- tri-[N- --; and that the said Letters Patent should be read with this correction therein that the same may conform to the record of the case in the Patent Office.

Signed and sealed this 31st day of August, A. D. 1943.

Henry Van Arsdale,
(Seal)                    Acting Commissioner of Patents.